United States Patent [19]

Langhart et al.

[11] Patent Number: 4,909,298

[45] Date of Patent: Mar. 20, 1990

[54] WINDOW COVERING CORD PULL SAFETY DEVICE

[76] Inventors: Richard M. Langhart; Karen F. Langhart, both of 3514 Earl Ave., Durango, Colo. 81301

[21] Appl. No.: 249,389

[22] Filed: Sep. 26, 1988

[51] Int. Cl.$^4$ .............................................. E06B 9/38
[52] U.S. Cl. ..................... 160/178.1; 160/320; 24/114.5; 24/303; 24/306; 24/602
[58] Field of Search ................ 160/178.1, 178.2, 320, 160/321, DIG. 16, 107; 24/115, 602, 143 B, 143 R, 303, 306, 114.5; 16/121, 122, 217, 218, 219, 202, 205, DIG. 12

[56] References Cited

U.S. PATENT DOCUMENTS

| | | | |
|---|---|---|---|
| 2,247,322 | 6/1941 | Stuber | 160/178.2 X |
| 2,637,887 | 5/1953 | Goodman et al. | 24/303 |
| 3,108,346 | 10/1963 | Bey | 24/303 |
| 3,485,285 | 12/1969 | Anderle | 160/178.1 X |
| 3,727,665 | 4/1973 | Debs | 160/178.2 |
| 4,366,852 | 1/1983 | Holzer | 160/320 |
| 4,411,044 | 10/1983 | Volfson | 16/219 |
| 4,477,947 | 10/1984 | Lyons | 24/115 F |
| 4,635,698 | 1/1987 | Anderson | 160/178.2 |

Primary Examiner—Ramon S. Britts
Assistant Examiner—David M. Purol
Attorney, Agent, or Firm—Ellsworth R. Roston; Charles H. Schwartz

[57] ABSTRACT

A safety device including first and second members is attached to the pull cords for window coverings to prevent children from strangling when the children play with the pull cords. Detents on first surfaces of the first and second members couple the first and second members in detachable relationship at the first surfaces upon the exertion of forces against the members in directions transverse to such first surfaces. The first member is retained by one of the cords at a position laterally displaced in a first direction from the first surfaces and the second member is retained by the other cord at a position laterally displaced from the first surfaces in a second direction opposite to the first direction. Such retentions are provided at second surfaces transverse to, and displaced from, the first surfaces. The second surfaces are shaped relative to each other to provide for the detachment of the first and second members at the first surfaces upon the exertion of forces in the direction of the first surfaces. Specifically, the second surfaces may slope downwardly to the first surfaces from the positions of retention by the cords. The members may be externally shaped to facilitate gripping in the palm of a hand with the members in attached relationship. The members may be removably attached to the frame of window coverings and may be formed to retain the cords in a looped configuration displaced from children's reach.

19 Claims, 2 Drawing Sheets

WINDOW COVERING CORD PULL SAFETY DEVICE

This invention relates to safety devices for cords for window coverings. More particularly, the invention relates to safety devices which are useful with cords for window coverings to prevent infants from strangling when the infants press their heads downwardly between the cords.

Window cords are coupled to window coverings to provide for adjustments in the vertical portions of the windows shielded by such coverings. The cords often extend downwardly to a position slightly above floor height or to a position at floor height although they may sometimes be disposed as high as several feet above floor height. The cords are generally attached to each other at their lower ends.

The window cords present an invitation to infants to play with such cords. The infants are fascinated by the cords, particularly since the cords move when touched. The infants are not aware of the dangers presented by such cords. For example, the cords may serve as a noose if the infants place their heads between the cords and press downwardly on the cords.

Many parents do not appreciate the dangers presented by the dangling cords and allow the cords to reach to, or close to, floor level. Parents sometimes appreciate the dangers presented by such cords and tie, clip or cleat the cords to shorten the cords. However, even these parents are sometimes negligent in adjusting the height of the cord after they have adjusted the position of the window covering.

In spite of the appreciation by many people that the problems resulting from dangling cords exist, no one has provided a satisfactory solution as yet to such problems. As a result, several children die annually from strangulation by playing with such cords. In addition, a considerable number of children probably become injured every year by playing with such cords but such injuries are not reported. This invention provides a device for overcoming the problems discussed above.

In one embodiment of the invention, a safety device is attached to the pull cords for window coverings to prevent children from strangling when the children play with the pull cords. The safety device includes first and second members. Detents are disposed on first surfaces of the first and second members for coupling the first and second members in detachable relationship to each other at the first surfaces upon the exertion of forces against the members in directions transverse to such first surfaces.

Provisions are made for attaching one end of one of the cords to the first member at a position laterally displaced in a first direction from the first surfaces and for attaching one end of the other cord to the second member at a position laterally displaced from the first surfaces in a second direction opposite to the first direction. Such attachments are made at second surfaces transverse to the first surfaces and are made at positions on the second surfaces displaced from the first surfaces.

The second surfaces are shaped relative to each other to provide for the detachment of the first and second members at the first surfaces upon the exertion of forces in the direction of the first surfaces. Specifically, the second surfaces may slope downwardly in one embodiment to the first surfaces from the positions of attachment to the cords. However, in other embodiments the sloping of the surfaces does not have to be provided. The members may be externally shaped to facilitate gripping in the palm of a hand with the members in attached relationship to provide for an adjustment in the positioning of the window covering.

Figure 1:
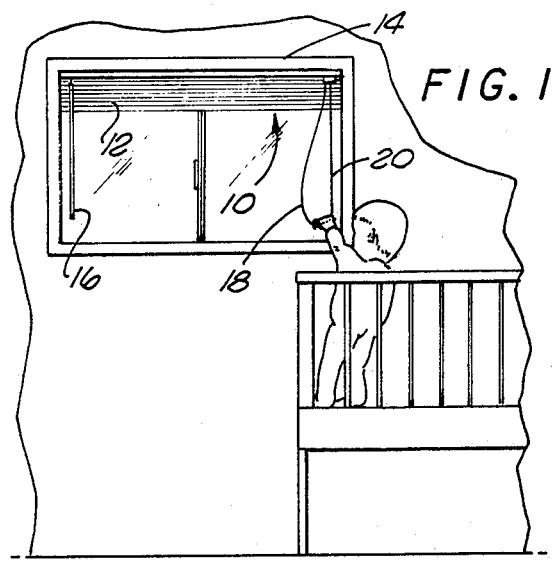
FIG. 1 is a schematic perspective view illustrating how infants are attracted by cords dangling from a window covering to provide for an adjustment in the vertical disposition of such covering.

In one embodiment of the invention, a window covering is generally indicated at 10. The window covering may comprise a plurality of slats 12 extending laterally across a window 14 and spaced vertically from one another. The slats 12 may be pivotable as by operating a lever 16. By operating the lever 16, the slats may be adjusted to pass light into a room from an exterior position or to inhibit light from passing into the room.

Cords 18 and 20 extend downwardly from the slats 12 to provide for adjustments of the slats in the vertical direction. The cords 18 and 20 are generally tied to each other at their lower ends. This causes the cords 18 and 20 to constitute a noose when an infant disposes his or her head between the cords and presses downwardly. Even when the cords are raised from the floor, infants in cribs can still find the cords to be attractive nuisances, particularly when the infants are standing on furniture or in their cribs.

This invention provides a device, generally indicated at 24, for preventing the cords 18 and 20 from constituting an attractive nuisance. The device 24 includes a pair of members 26 and 28. Each of the members 26 and 28 has an ear 30 which extends toward the other member from a position at the outer end of the member and which has a hole 32 for receiving an associated one of the cords 18 and 20. After being extended through the holes 32, the ends of the cords 18 and 20 may be knotted as at 35 to retain the cords in fixed relationship to the associated member.

Figure 3:
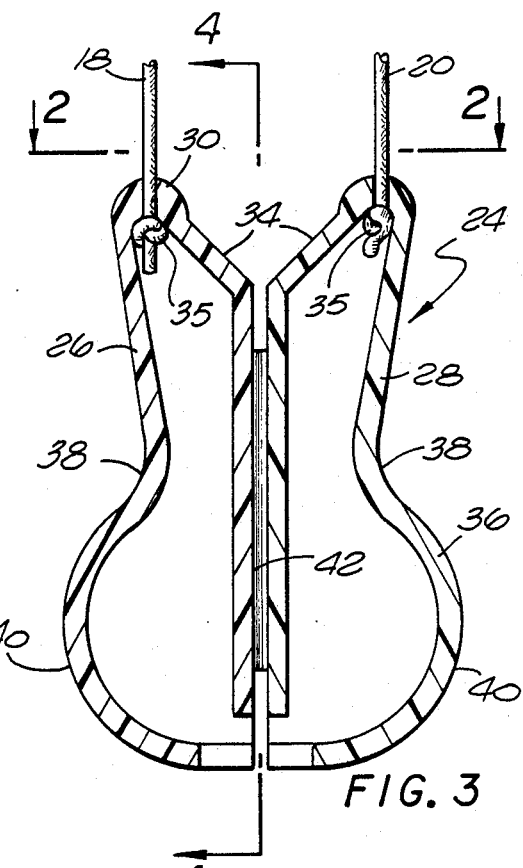
FIG. 3 is a sectional view of the device shown in FIG. 2 and is taken substantially on the line 3—3 of FIG. 2.

The members 26 and 28 may have upper external surfaces 34 which slope toward one another when the members are disposed in coupled relationship to each other as in FIG. 3. However, as will be appreciated, such sloping surfaces do not have to be provided on the members 26 and 28. The members 26 and 28 also have side surfaces 36 which slope toward each other to form a waist portion 38 at an intermediate position in the vertical direction and then bulge outwardly at the bottom portions as at 40. The waist portions 38 and the bulge portions 40 facilitate the gripping of the members 26 and 28 in the palm of a hand to facilitate a manual adjustment in the height of the window covering 10.

Figure 5:
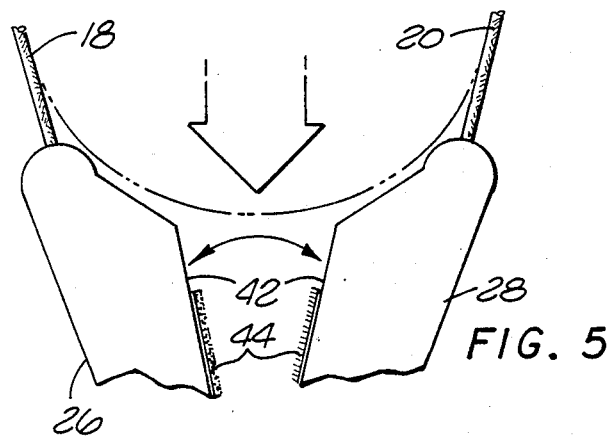
FIG. 5 is a fragmentary exploded front elevational view showing how the device operates in response to a force for preventing an infant from strangling.
Figure 6:
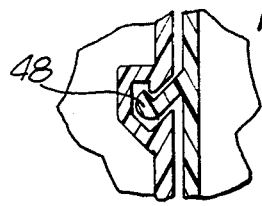
FIGS. 6, 7 and 8 show alternative arrangements for insuring that the device shown in FIGS. 2-5 is operative to prevent an infant from strangling when the infant exerts a force on the device.
Figure 7:
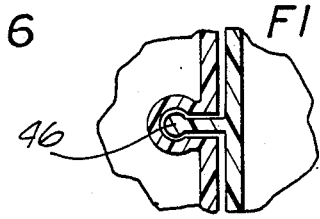
Figure 8:
Figure 9:
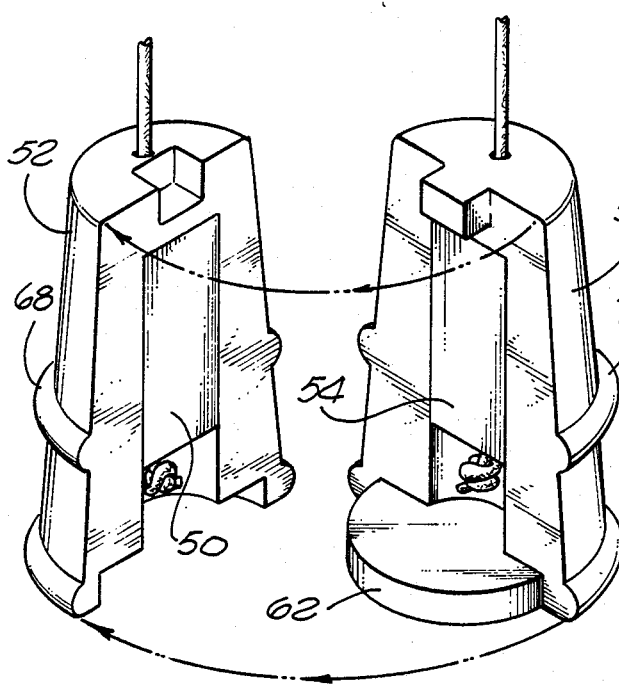
FIG. 9 is a schematic fragmentary exploded perspective view which shows a further embodiment of the invention for retaining the cords for the window covering out of the reach of children.
Figure 10:
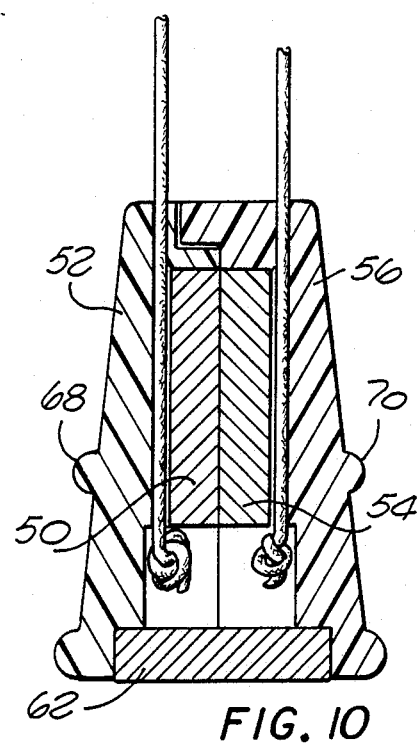
FIG. 10 is a sectional view in elevation of the embodiment shown in FIG. 9.
Figure 12:
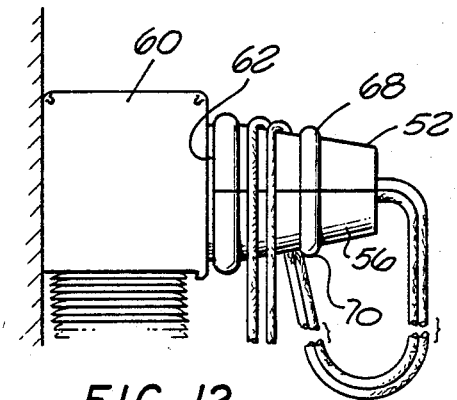
FIG. 12 is an enlarged fragmentary elevational view illustrating how the embodiment of FIGS. 9 and 10 is able to retain the cord out of the reach of infants.
Figure 11:
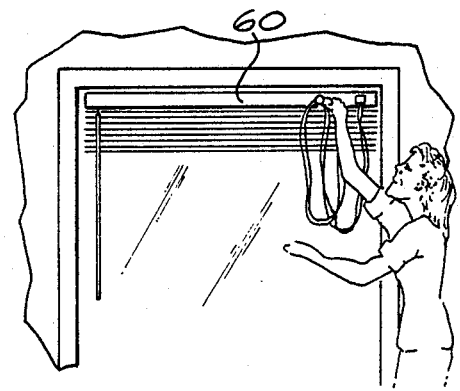
FIG. 11 is a schematic view illustrating how an adult is able to dispose the cords out of the reach of an infant.
Figure 13:
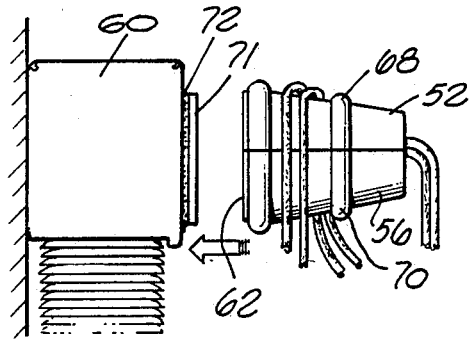
FIG. 13 is a view similar to that shown in FIG. 12 and illustrates a modification of the embodiment shown in FIG. 12.
Figure 14:
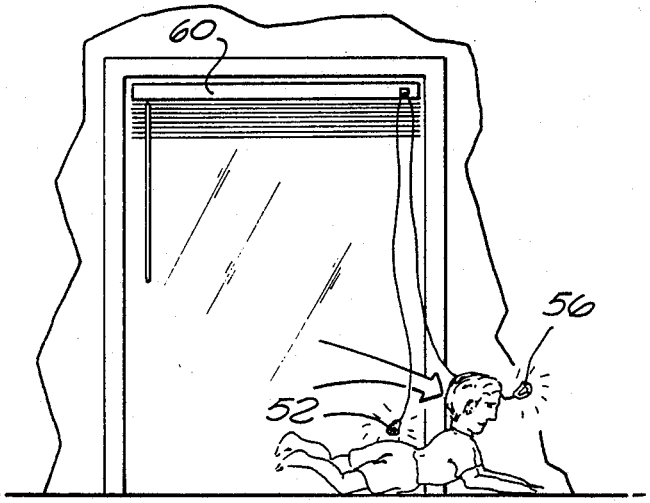
FIG. 14 is a schematic view illustrating the safety action of the embodiments of this invention in preventing infants from becoming strangled by the cords for the window coverings.

Each of the members 26 and 28 may be provided with a surface 42 at a position contiguous to the corresponding surface on the other member. Preferably the surfaces 42 are vertical but may be provided with any other suitable disposition. Detents may be provided on the surfaces 42. The detents may have any suitable construction. For example, the detents may constitute strips 44 (FIG. 5) made from a suitable material such as "Velcro" to provide an adherent relationship which can be separated by the application of a force to separate the strips. The detents may also constitute snaps 46 (FIG. 7) or hooks 48 (FIG. 6) and/or 50 (FIG. 8). The detents may also constitute a permanent magnet on one of the surfaces 42 and a magnetizable material on the other one of the surfaces 42. As will be appreciated, the sloping surfaces 34 do not have to be provided in these embodiments. For example, when a permanent magnet is used, the force exerted by the permanant magnet may be so low that the advantages of the sloping surfaces 34 do not have to be provided.

When an infant disposes his or her head between the cords 18 and 20 and presses downwardly on the surfaces 34, the transverse angles of the surfaces 34 in the embodiment shown in FIGS. 1-4 cause a force to be produced in directions having a horizontal component. The horizontal component of the force on the member 26 is in a direction opposite to the horizontal component of the force on the member 28. This causes the members 26 and 28 to become separated from each other. In this way, the infant cannot become injured in any way.

Figure 2:
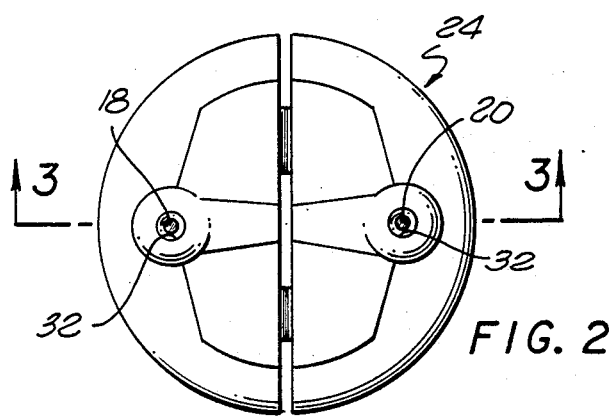
FIG. 2 is a top plan view of a device for attachment to the cords for a window covering to provide an arrangement to prevent infants playing with such cords from strangling or becoming injured and is taken substantially on the line 2—2 of FIG. 3.
Figure 4:
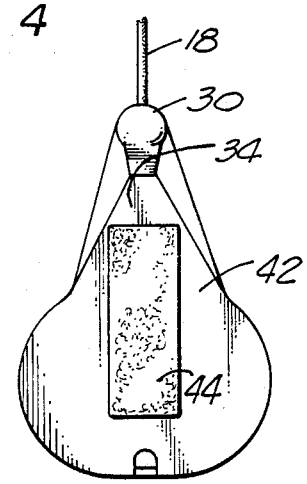
FIG. 4 is a side elevational view of the device shown in FIGS. 2 and 3.

As will be seen in FIG. 2, the members 26 and 28 define an annular configuration at their upper end. This prevents the infant from being cut or scraped by the members 26 and 28 when the infant disposes his or her head on the members. Furthermore, as shown in FIG. 2, the members 26 and 28 define a hollow interior when they are disposed in a coupled relationship. This facilitates the knotting of the ends of the cords after the cords have been inserted through the holes 32. The members 26 and 28 are shaped to facilitate a comfortable manual operation of the members.

FIGS. 9-14 illustrate another embodiment of the invention. In this embodiment, a magnet 50 is provided on a member 52 and a magnetizable member 54 is provided on a member 56 to retain the members 52 and 56 in abutting relationship. In this embodiment, the magnet 50 is provided with such a low strength that the members 52 and 56 become separated when a child exerts a force on the members. As will be seen, the members 52 and 56 are not provided with sloping surfaces at their upper ends as in the previous embodiment.

Ridges 68 and 70 may be respectively disposed on the peripheries of the members 26 and 28 at an intermediate position along the height of these members. The ridges 68 and 70 are provided to dispose the dangling ends of the cords 18 and 20 on the members 52 and 56 after the cords have been wrapped around these members. This disposition is such that the dangling ends of the cords 18 and 20 can be disposed at a height sufficiently above floor level to prevent infants, and even children, from reaching these dangling ends.

To dispose the dangling ends of the cords 18 and 20 at a safe vertical distance above the floor, the dangling ends of the cords 18 and 20 are wrapped around the members 52 and 56. The loops formed by the dangling ends of the cords 18 and 20 are confined by the ridges 68 and 70 to a limited distance along the members 26 and 28. The dangling ends of the cords 18 and 20 are retained in this looped relationship by the attraction between the frame 60 and a permanent magnet 62 when the frame is made from a magnetizable material. The permanent magnet 62 is disposed at the bottom of the member 52.

It may sometimes happen that the frame 60 may not be made from a magnetizable material. To attach the dangling ends of the cords 18 and 20 to the frame 60, a permanent magnet 71 may be provided. A suitable adhesive material 72 such as "Velcro" may be disposed at one end of the permanent magnet 71 to provide for a removable disposition of the permanent magnet on the frame. The "Velcro" surface 72 may be adhered to the frame 60 and the magnet 62 may then be attached to the magnet 71.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for use with window coverings,
    a first cord having first and second opposite ends and constructed at the first end for attachment to the window covering,
    a second cord having first and second opposite ends and constructed at the first end for attachment to the window covering,
    a first member retained by the first cord at the second end of the first cord,
    a second member retained by the second cord at the second end of the second cord, and
    means for detachably coupling the first and second members to each other in a relationship providing for a detachment of the members from each other upon the exertion of a downward force against the first and second members at positions between the first and second cords.

2. In a combination as set forth in claim 1,
    the first and second members being shaped at their upper ends to facilitate a detachment between the first and second members upon the exertion of a downward force upon the members at a position between the cords,
    the first member being retained by the first cord at a position at the outer end of the first member laterally opposite the detachable coupling of the first and second members and the second member being retained by the second cord at a position at the outer end of the second member laterally opposite the lateral coupling of the first and second members.

3. In a combination as set forth in claim 1, each of the first and second members having an upper surface sloping downwardly, at a transverse angle to the detachable coupling of the members to each other, toward the positions of the detachable coupling of the members from the position of retention of the members by the respective cords.

4. In a combination as set forth in claim 3, the members being shaped to facilitate their gripping in the palm of a hand when a force is to be applied to the cords to adjust the vertical position of the window covering.

5. In a combination as set forth in claim 4, the first and second members being hollow to facilitate the retention of the members by the cords at internal positions within the members.

6. In combination for use with a window covering having first and second control cords extending therefrom a first member having a first surface, a second member having a second surface, detent means disposed on said first and second surfaces of the first and second members for coupling the first and second members in detachable relationship to each other upon the exertion of forces against the first and second members in directions transverse to said first and second surfaces, first means disposed on the first member for providing retention of the first member by said first control cord at a position laterally displaced in a first direction from the detent means, and second means disposed on the second member for providing retention of the second member by said second control cord at a position laterally displaced from the detent means in a second direction opposite to the first direction.

7. In a combination as set forth in claim 6, the first and second members having third and fourth surfaces respectively transverse to the first and second surfaces, the third and fourth surfaces sloping downwardly to the first and second surfaces to provide for the detachment of the first and second members upon the exertion of forces against the third and fourth surfaces.

8. In a combination as set forth in claim 6, the first and second members having third and fourth surfaces respectively transverse to the first and second surfaces, each of the third and fourth surfaces sloping downwardly from the respective one of the first and second means to the first and second surfaces to facilitate detachment of the first and second members from each other upon the exertion of downward forces against the third and fourth surfaces at positions between the first and second means.

9. In a combination as set forth in claim 8, the first and second members being hollow and the first and second means respectively extending through the first and second members to provide for the respective passage of the first and second control cords to positions interior to the first and second members.

10. In a combination as set forth in claim 9, the first and second members being externally shaped to facilitate gripping in the palm of a hand with the members in attached relationship to provide for an adjustment in the positioning of the window covering.

11. In a combination as set forth in claim 1 wherein the window covering has a frame, first and second attachment means carried by the first and second members respectively for removably attaching the members to the frame.

12. In a combination as set forth in claim 11 where the frame is magnetizable, the first attachment means carried by the first member for removably the attaching the first and second members to the frame constituting a permanent magnet.

13. In a combination as set forth in claim 11 where the frame is non-magnetizable, magnetizable means removably attachable to the frame, and the first attachment means carried by the first member constituting a permanent magnet for cooperating with the magnetizable means to retain the first and second members in removably attached relationship to the frame.

14. In a combination as set forth in claim 6 where the window covering has a frame, first and second attachment means carried by the first and second members respectively for removably attaching the members to the frame.

15. In a combination as set forth in claim 11, retaining means disposed on the members for retaining the cords in a looped relationship when the members are removably attached to the frame.

16. In a combination as set forth in claim 13, retaining means disposed on the first and second members for retaining the cords in a looped configuration on the members when the members are removably attached to the frame.

17. In a combination as set forth in claim 14, retaining means disposed on the members for retaining the cords in a looped configuration on the members when the members are removably attached to the frame.

18. In a combination as set forth in claim 14 where the frame is magnetizable, the first and second attachment means for removably attaching the members to the frame constituting a permanent magnet.

19. In a combination as set forth in claim 18, ridges being disposed on the members to confine the cords in a looped configuration on the members when the members are removably attached to the frame.

* * * * *